US010628609B2

(12) United States Patent
Godas-Lopez et al.

(10) Patent No.: US 10,628,609 B2
(45) Date of Patent: Apr. 21, 2020

(54) METHOD AND APPARATUS FOR PERFORMING SIGNATURE VERIFICATION BY OFFLOADING VALUES TO A SERVER

(71) Applicant: QUALCOMM Incorporated, San Diego, CA (US)

(72) Inventors: Daniel Godas-Lopez, San Diego, CA (US); Robert Terashima, San Diego, CA (US); Ryan Puga Nakamoto, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 259 days.

(21) Appl. No.: 15/605,777

(22) Filed: May 25, 2017

(65) Prior Publication Data

US 2018/0341786 A1 Nov. 29, 2018

(51) Int. Cl.
*G06F 21/64* (2013.01)
*G06F 7/72* (2006.01)
*G06F 21/51* (2013.01)

(52) U.S. Cl.
CPC .............. *G06F 21/64* (2013.01); *G06F 7/727* (2013.01); *G06F 21/51* (2013.01)

(58) Field of Classification Search
CPC ........ G06F 21/64; G06F 21/604; G06F 7/727; G06F 9/38; G06F 9/3848; G06F 21/51
See application file for complete search history.

(56) References Cited

U.S. PATENT DOCUMENTS

| 7,715,551 | B2 | 5/2010 | Plessier | |
|---|---|---|---|---|
| 7,870,399 | B2 | 1/2011 | Bryant et al. | |
| 8,538,938 | B2 | 9/2013 | Cormode et al. | |
| 8,799,754 | B2 | 8/2014 | Cormode et al. | |
| 8,886,949 | B2 | 11/2014 | Tagashira | |
| 2001/0042222 | A1* | 11/2001 | Kedem | G06F 11/1458 714/6.32 |
| 2002/0034215 | A1* | 3/2002 | Inoue | H04B 1/7117 375/147 |
| 2003/0070071 | A1* | 4/2003 | Riedel | G06F 21/6218 713/165 |
| 2003/0221077 | A1* | 11/2003 | Ohno | G06F 3/0607 711/165 |
| 2004/0215864 | A1* | 10/2004 | Arimilli | G06F 13/4081 710/302 |
| 2005/0050134 | A1* | 3/2005 | Winterrowd | G06F 7/5318 708/620 |

(Continued)

*Primary Examiner* — Thanhnga B Truong
(74) *Attorney, Agent, or Firm* — Loza & Loza, LLP

(57) ABSTRACT

In an aspect, an apparatus obtains at least a first input value and a second input value from a sender device. The apparatus performs a computational operation between portions of the first input value and portions of the second input value to obtain a plurality of partial results of the computational operation. The apparatus applies a hash function to each of the plurality of partial results of the computational operation to obtain a hash of a final result of the computational operation between the first input value and the second input value. The apparatus obtains the final result of the computational operation from the sender device. The apparatus verifies that the final result of the computational operation from the sender device is correct based on the hash of the final result of the computational operation.

30 Claims, 9 Drawing Sheets

(56) References Cited

U.S. PATENT DOCUMENTS

| | | | | |
|---|---|---|---|---|
| 2005/0071274 A1* | 3/2005 | Pfaff | ............ | G06F 21/10 705/51 |
| 2005/0207393 A1* | 9/2005 | Becker | ............ | H04B 7/2681 370/350 |
| 2006/0288238 A1* | 12/2006 | Ray | ............ | G06F 21/10 713/193 |
| 2007/0011401 A1* | 1/2007 | Zhang | ............ | G06F 3/061 711/114 |
| 2008/0027866 A1* | 1/2008 | Halcrow | ............ | G06F 21/31 705/51 |
| 2009/0094673 A1* | 4/2009 | Seguin | ............ | G06F 21/51 726/1 |
| 2014/0297996 A1* | 10/2014 | Jayaseelan | ............ | G06F 9/3848 712/239 |
| 2015/0007265 A1* | 1/2015 | Aissi | ............ | G06F 21/60 726/3 |

* cited by examiner

FIG. 2

```
           2
       1 0 ⎡3⎤
    ×    2 ⎢7⎥ ~302
    ─────── ⎢ ⎥
       ? ? ⎢1⎥
    + ? ? ?⎢ ⎥
    ─────── ⎢ ⎥
       ? ? ?⎣1⎦
              ↑
              ~304
        First partial result
```

300 →

```
       ⎡2⎤ ~312
       ⎢1 0⎥ 3
    × ⎢  2⎥ 7
    ───⎢───⎥───
       ⎢? 0⎥ 1
    + ⎢? ?⎥ 6
    ───⎢───⎥───
       ⎣? ?⎦ 8 1
           ↑
           ~314
      Second partial result
```

```
           322
        ⌒
     320   2
      ↘ ┌──┐
        │ 2│
        │1 0│ 3
      × │ 2│ 7
      ──┼──┼──
        │ 7│0 1
      +?│ 0│ 6
      ──┼──┼──
       ?│ 7│8 1
        └──┘
           ↑
          324
   Third partial result
```

```
           332
        ⌒
     330   2
      ↘ ┌──┐
        │  │ 2
        │1 0│ 3
      × │  │ 2 7
      ──┼──┼──
        │ 7│ 0 1
      +│ 2│ 0 6
      ──┼──┼──
        │ 2│ 7 8 1
        └──┘
         ↑
        334
   Fourth partial result
```

FIG. 3B

METHOD AND APPARATUS FOR PERFORMING SIGNATURE VERIFICATION BY OFFLOADING VALUES TO A SERVER

INTRODUCTION

Field of the Disclosure

Aspects of the disclosure relate generally to a method and apparatus for performing signature verification by offloading values to a server.

Background

Electronic devices, such as embedded devices, are frequently memory-constrained. For example, Internet of Things (IoT) devices are typically designed to operate with low memory and CPU requirements in order to reduce costs. These electronic devices may need verified updates (e.g. firmware updates) to, for example, patch security vulnerabilities. Such updates may need to be cryptographically verified (e.g. via a signature algorithm, such as RSASSA-PKCS or RSASSA-PSS). However, such cryptographic verifications may require arithmetic operations involving large input values, which may be difficult or impossible for electronic devices to perform under some circumstances. For example, an electronic device may become memory-constrained and, therefore, may not have enough storage capacity (e.g., available memory space) to store the large input values and/or perform the required arithmetic operations involving the large input values.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In an aspect, a method is provided. For example, the method may be performed by an apparatus, such as a receiver device as described herein. The apparatus obtains at least a first input value and a second input value from a sender device. In one aspect of the disclosure, a size of at least one of the first input value or the second input value exceeds an available storage capacity of an apparatus. In one aspect of the disclosure, a size of required intermediate results of the computational operation between the first input value and the second input value exceeds an available storage capacity of an apparatus. In one aspect of the disclosure, a size of the final result of the computational operation between the first input value and the second input value exceeds an available storage capacity of an apparatus. In one aspect of the disclosure, a total size of one of the portions of the first input value, one of the portions of the second input value, and one of the partial results of the computational operation is less than or equal to the available storage capacity of an apparatus.

The apparatus verifies an integrity of at least the first input value or the second input value each time that the first input value or the second input value is obtained. In one aspect of the disclosure, the apparatus verifies the integrity of at least the first input value or the second input value by obtaining a hash of the first input value or a hash of the second input value, and matching the obtained hash of the first or second input value to a previously obtained hash. In one aspect of the disclosure, the previously obtained hash is included in a hash tree. In one aspect of the disclosure, the sender device is an untrusted sender device.

The apparatus performs a computational operation between portions of the first input value and portions of the second input value to obtain a plurality of partial results of the computational operation. In one aspect of the disclosure, a size of each of the portions of the first input value and each of the portions of the second input value are selected based on an available storage capacity of an apparatus, such that when the size is increased, a processing bandwidth of the apparatus is increased and a processing delay of the apparatus is reduced. In one aspect, at least the first input value or the second input value is obtained from the sender device prior to performing each step of the computational operation.

In one aspect of the disclosure, the computational operation may be a multiplication operation. In such aspect, the final result of the operation may be a product between the first input value and the second input value. In one aspect, the first input value is a divisor value in a modulo operation, and the second input value is a quotient value associated with the modulo operation.

In one aspect of the disclosure, the computational operation is an addition operation. In such aspect, the final result of the operation may be a sum between the first input value and the second input value The apparatus applies a hash function to each of the plurality of partial results of the computational operation to obtain a hash of a final result of the computational operation between the first input value and the second input value. In one aspect of the disclosure, the apparatus applies the hash function to each of the plurality of partial results by initializing a hash context, updating the hash context as each one of the plurality of partial results is obtained, and discarding each of the plurality of partial results after the hash context is updated. In one aspect of the disclosure, the hash function is a non-keyed hash function. In another aspect of the disclosure, the hash function is a keyed hash function.

The apparatus obtains the final result of the computational operation from the sender device 610. The apparatus may apply the hash function to the final result obtained from the sender device to obtain a second hash of the final result. The apparatus verifies that the final result of the computational operation from the sender device is correct based on the hash of the final result of the computational operation. In an aspect, the apparatus verifies that the final result of the computational operation from the sender device is correct by matching the hash of the final result to the second hash of the final result.

In an aspect of the disclosure, the final result of the computational operation may be a third input value for a second computational operation. In such aspect, the apparatus obtains a fourth input value from the sender device. The apparatus performs the second computational operation between portions of the third input value and portions of the fourth input value to obtain a plurality of partial results of the second computational operation. The apparatus applies the hash function to each of the plurality of partial results of the second computational operation to obtain a hash of a final result of the second computational operation between the third input value and the fourth input value.

In an aspect, the second computational operation may be an addition operation, the third input value may be a product of a divisor value and a quotient value, and the fourth input value may be a remainder value of a modulo operation with respect to a dividend value and the divisor value. In such aspect, the apparatus verifies that the dividend value is equal to the sum of the remainder value and the product of the divisor value and the quotient value by matching a hash of the dividend value to the hash of the final result of the second computational operation between the third input value and the fourth input value.

The apparatus verifies a signature of a message obtained from the sender device based at least on the fourth input value and a hash of the message. The apparatus processes the message when the verification of the signature is successful.

In an aspect of the disclosure, an apparatus is provided. The apparatus may include a storage device and a processing circuit coupled to the storage device. The processing circuit may be configured to obtain at least a first input value and a second input value from a sender device, perform a computational operation between portions of the first input value and portions of the second input value to obtain a plurality of partial results of the computational operation, apply a hash function to each of the plurality of partial results of the computational operation to obtain a hash of a final result of the computational operation between the first input value and the second input value, obtain the final result of the computational operation from the sender device, and verify that the final result of the computational operation from the sender device is correct based on the hash of the final result of the computational operation.

In an aspect, the sender device may be an untrusted sender device. In such aspect, the processing circuit is further configured to verify an integrity of at least the first input value or the second input value each time that the first input value or the second input value is obtained. In an aspect, the final result of the computational operation is a third input value for a second computational operation. In such aspect, the processing circuit is further configured to obtain a fourth input value from the sender device, perform the second computational operation between portions of the third input value and portions of the fourth input value to obtain a plurality of partial results of the second computational operation, and apply the hash function to each of the plurality of partial results of the second computational operation to obtain a hash of a final result of the second computational operation between the third input value and the fourth input value.

In an aspect, the second computational operation is an addition operation, the third input value is a product of a divisor value and a quotient value, and the fourth input value is a remainder value of a modulo operation with respect to a dividend value and the divisor value. In such aspect, the processing circuit is further configured to verify that the dividend value is equal to the sum of the remainder value and the product of the divisor value and the quotient value by matching a hash of the dividend value to the hash of the final result of the second computational operation between the third input value and the fourth input value.

In an aspect, the processing circuit is further configured to verify a signature of a message obtained from the sender device based at least on the fourth input value and a hash of the message, and process the message when the verification of the signature is successful.

In an aspect, the processing circuit is further configured to apply the hash function to the final result obtained from the sender device to obtain a second hash of the final result. In one aspect, the verifying that the final result of the computational operation from the sender device is correct comprises matching the hash of the final result to the second hash of the final result.

In one aspect, an apparatus is provided. The apparatus includes means for obtaining at least a first input value and a second input value from a sender device, means for performing a computational operation between portions of the first input value and portions of the second input value to obtain a plurality of partial results of the computational operation, means for applying a hash function to each of the plurality of partial results of the computational operation to obtain a hash of a final result of the computational operation between the first input value and the second input value, means for obtaining the final result of the computational operation from the sender device, and means for verifying that the final result of the computational operation from the sender device is correct based on the hash of the final result of the computational operation. In an aspect, the sender device is an untrusted sender device. In such aspect, the apparatus further includes means for verifying an integrity of at least the first input value or the second input value each time that the first input value or the second input value is obtained.

In an aspect, the final result of the computational operation is a third input value for a second computational operation. In such aspect, the apparatus further includes means for obtaining a fourth input value from the sender device, means for performing the second computational operation between portions of the third input value and portions of the fourth input value to obtain a plurality of partial results of the second computational operation, and means for applying the hash function to each of the plurality of partial results of the second computational operation to obtain a hash of a final result of the second computational operation between the third input value and the fourth input value.

In an aspect, the apparatus further includes means for applying the hash function to the final result obtained from the sender device to obtain a second hash of the final result, wherein the verifying that the final result of the computational operation from the sender device is correct comprises matching the hash of the final result to the second hash of the final result.

In an aspect, a non-transitory machine-readable storage medium is provided. The machine-readable storage medium has one or more instructions which when executed by a processing circuit causes the processing circuit to obtain at least a first input value and a second input value from a sender device, perform a computational operation between portions of the first input value and portions of the second input value to obtain a plurality of partial results of the computational operation, apply a hash function to each of the plurality of partial results of the computational operation to obtain a hash of a final result of the computational operation between the first input value and the second input value, obtain the final result of the computational operation from the sender device, and verify that the final result of the computational operation from the sender device is correct based on the hash of the final result of the computational operation.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

FIG. 2 shows an example offloaded addition operation in accordance with the various aspects of the disclosure.

FIG. 3 (including FIGS. 3A and 3B) shows an example offloaded multiplication operation in accordance with the various aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
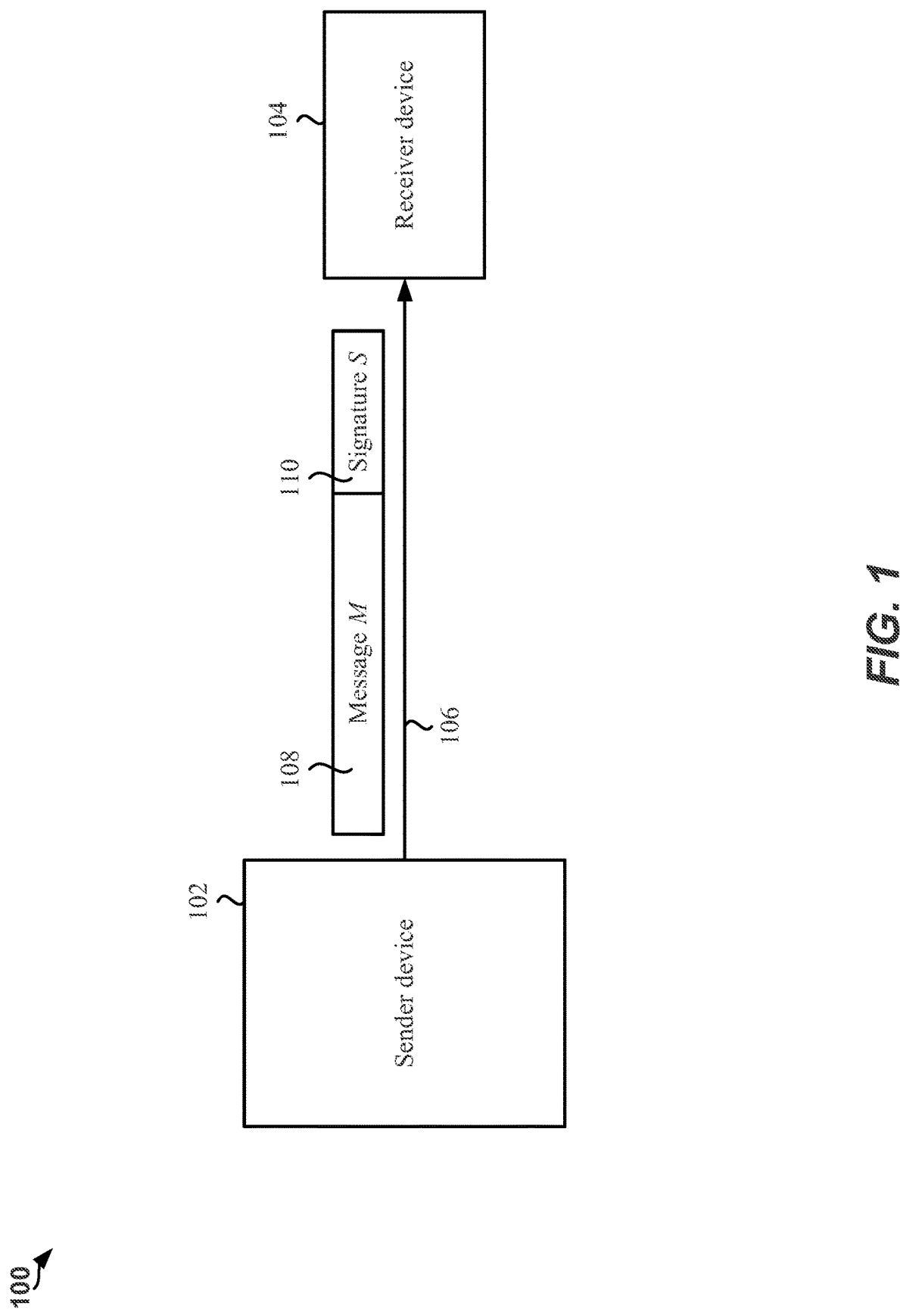
FIG. 1 is a diagram illustrating a sender device in communication with a receiver device in accordance with the various aspects of the disclosure.

FIG. 1 is a diagram illustrating a sender device in communication with a receiver device in accordance with various aspects of the disclosure. In one aspect of the disclosure, the sender device 102 in FIG. 1 may be, for example, a server, a hub, a disk drive, or other suitable electronic device. In one aspect of the disclosure, the sender device 102 may be an untrusted device, such as an untrusted server. In one aspect of the disclosure, the receiver device 104 may be a client device, such as an Internet of Things (IoT) device, a smartphone, or other suitable electronic device.

As shown in FIG. 1, the sender device 102 may send a data transmission 106 to the receiver device 104. In one aspect of the disclosure, the sender device 102 may send the data transmission 106 through a wired (e.g., Ethernet, Universal Serial Bus (USB)) or wireless (e.g., WiFi®, Bluetooth®, LTE) communication channel. As further shown in FIG. 1, the data transmission 106 may include a message M 108 with an attached signature S 110. For example, the message M 108 may represent a sequence of bits (e.g., a bit string), and the signature S 110 may represent a digital signature, such as a Rivest-Shamir-Adleman (RSA) signature. Therefore, in one aspect of the disclosure, when the receiver device 104 receives the data transmission 106, the receiver device 104 may verify that the message M 108 originated from the sender device 102 by verifying the authenticity of the signature S 110.

In one aspect of the present disclosure, to verify the authenticity of the signature S 110, the device may verify that equation 1 below is satisfied:

$$S^e = \text{PAD}(H(M))(\bmod N) \quad \text{(equation 1)}$$

where $H(M)$ represents the result of a hash function applied to the message M 108, PAD represents a padding function, and the pair $(e, N)$ represents the public key of the entity (e.g., the sender device 102) responsible for signing the message M 108. Therefore, it can be appreciated that verification of a digital signature (e.g., verification that equation 1 holds in the example case of an RSA signature) may require several multiplication and/or addition operations involving large input values (e.g., values having a length of 2048 bits). As such, in some circumstances, the entity (e.g., the receiver device 104) that needs to perform the verification may not have an adequate amount of available storage (e.g., random access memory (RAM)) to perform such multiplication and/or addition operations involving large input values. The aspects disclosed herein may be implemented to reduce the amount of storage required to perform the above-mentioned multiplication and/or addition operations involving large input values. Table 1 below shows the memory required for verifying an exemplary 2048-bit RSA signature.

TABLE 1

| Value | Standard required memory (bits) | Reduced required memory (bits) |
|---|---|---|
| S | 2048 | 256 |
| e | <256 | <256 |
| N | 2048 | 256 |
| $S^e$ | 2048 | 256 |
| M | Len(M) | 256 |
| PAD(H(M)) | 2048 | 256 |

Streaming Cryptographic Hash Functions

A hash function (also referred to as a cryptographic hash function in some aspects) may have a property that enables computation of a hash as data is streamed into the hash function. For example, consider the Secure Hash Function 256 (SHA-256). In such example, the receiver device 104 is not required to store (e.g., in a memory, such as RAM) the entirety of the message M 108 to apply the SHA-256 to the message M 108. Instead, the receiver device 104 may apply the SHA-256 to portions of the message M 108 and update the state of the hash function calculation on the fly. In one aspect of the disclosure, the receiver device 104 may repeatedly stream in the entire message M 108 to obtain the hash of the message M 108. In such aspect, the receiver device 104 may obtain a different portion of the message M 108 after each time the message M 108 is received at the receiver device 104, and may apply the SHA-256 to that obtained portion of the message M 108. The receiver device 104 may continue to repeatedly stream in the entire message M 108 until the SHA-256 has been applied to all portions of the message M 108 and the hash of the message M 108 has been obtained. For example, this procedure may be represented as the following pseudo-code:

```
hash_state = new SHA_256( )
while pieces remain:
    p = get_next_piece( )
    hash_state.update(p)
return hash_state
```

Therefore, while in the process of verifying an RSA signature, the receiver device 104 may store hashes of portions of a large input value of an arithmetic operation (also referred to herein as a computational operation) or hashes of portions of an intermediate value of an arithmetic operation, and may not need to store the entirety of the large input value and/or the intermediate value. In one example, a large input value may be a 2048-bit number representing the result (e.g., remainder) of a modulo operation, and a portion of such large input value may be a 32-bit number (also referred to as a 32-bit word). In such example, the large input value (e.g., 2048 bits in length) may be segmented into 64 portions, where each portion is a 32-bit number. In another example, an intermediate value may be a 2048-bit number representing a result (e.g., a product or sum) of a step in an arithmetic operation between two numbers, and a portion of such intermediate value may be a 32-bit number (e.g., also referred to as a 32-bit word). In such example, the intermediate value (e.g., 2048 bits in length) may be segmented into 64 portions, where each portion is a 32-bit number. It should be understood that in some aspects of the disclosure, the size (e.g., number of bits, or bit-length) of a large input value or an intermediate value may be different from the examples provided herein. In some aspects of the disclosure, the size of an intermediate value may be less than or greater than the size of a large input value (e.g., the bit-length of an intermediate value may be less than or greater than the bit-length of a large input value). It should also be understood that in some aspects of the disclosure, the size (e.g., number of bits, or bit-length) of a portion of a large input value or an intermediate value may be different from the examples provided herein.

In some aspects of the disclosure, the receiver device 104 may not have adequate storage capacity (e.g., available memory space or RAM) to store either or both of two large input values that are required for an arithmetic operation. In one example, each of the two large input values may be a 2048-bit number. Moreover, the receiver device 104 may not have adequate storage capacity to store any intermediate values that may result from various steps of the arithmetic operation. However, the receiver device 104 may have adequate storage capacity to store one or more portions (e.g., words) of the two large input values and/or one or more portions of any intermediate values. Accordingly, and as described in detail below, when the receiver device 104 needs to perform an arithmetic operation between two large input values, the receiver device 104 may perform the arithmetic operation one portion at a time until the final result of the arithmetic operation between the two large input values is obtained. In an aspect, a hash of the final result of the arithmetic operation between the two large input values may be obtained.

In an aspect of the disclosure, whenever the receiver device 104 needs to obtain a portion (e.g., a word) of an input value or a portion of an intermediate value to perform an arithmetic operation, the receiver device 104 may stream in the entire input value or intermediate value from the sender device 102 and may store only the required word. In an aspect of the disclosure, the receiver device 104 may proceed to obtain the hash of the input value or the intermediate value as it is streamed in from the sender device 102 and may verify that the hash is correct. This allows the receiver device 104 to detect when the sender device 102 behaves maliciously.

In an aspect of the disclosure, the receiver device 104 may obtain a result of an arithmetic operation (e.g., between two large input values) one word at a time. Therefore, rather than storing the entire result in a memory of the receiver device 104, these words may be streamed into a hash function as they are produced. Therefore, when the arithmetic operation is complete, the receiver device 104 will have the hash of the final result of the arithmetic operation between the two input values without ever storing the final result in a memory of the receiver device 104.

Offloaded Addition

Figure 2:
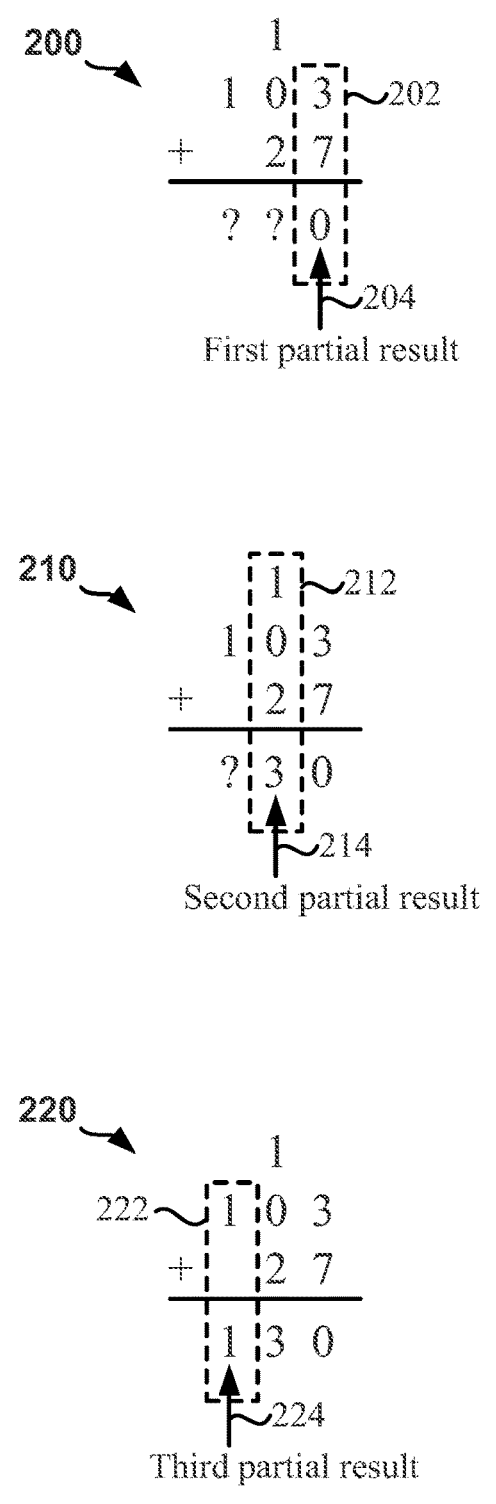

FIG. 2 shows an example of an offloaded addition operation in accordance with the various aspects disclosed herein. In an aspect of the disclosure, the offloaded addition operation may be performed by the receiver device 104. In one example, the receiver device 104 may try to obtain the value C, where C=A+B. In such example, and as shown in FIG. 2, the value A may be 103 and the value B may be 27. In an aspect of the disclosure, the receiver device 104 may not have adequate storage capacity to store the values 103 and 27. In an aspect of the disclosure, the receiver device 104 may obtain the hash of the value 103 and the hash of the value 27. In an aspect, the hash of the value 103 may be referred to as "H1" and may be obtained by implementing a suitable hash function such as a hash function SHA256 (103), and the hash of the value 27 may be referred to as "H2" and may be obtained by implementing a suitable hash function such as a hash function SHA256(27).

As shown in the first operation 200 in FIG. 2, in obtaining the sum of the values 103 and 27, the value three may be added to the value seven as indicated in the first column 202. As further shown in operation 200 of FIG. 2, since this addition operation yields the value 10, the first partial result 204 is zero and a carry value one is applied to the next column of numbers.

In one aspect of the disclosure, to perform the previously discussed first operation 200, the receiver device 104 may perform the following procedure. The receiver device 104 may initialize a new hash context. For example, the receiver device 104 may implement the function "hash_sum=new SHA_256( )." The receiver device 104 may stream the value 103 from the sender device 102, compute the hash of the value 103, and store the value three. The receiver device 104 may verify that the computed hash of the value 103 matches H1 described above. The receiver device 104 may then stream the value 27 from the sender device 102, compute the hash of the value 27, and store the value seven. The receiver device 104 may verify that the computed hash of the value 27 matches H2 described above. The receiver device 104 may then obtain the sum of the value three and the value seven. The receiver device 104 may identify the value zero as being the partial result (e.g., the first partial result 204) of the sum of the value three and the value seven and may update the hash context state "hash_sum" accordingly. For example, the receiver device 104 may implement the function "hash_sum.update(0)." The receiver may identify the value one as being the carry value resulting from the sum of the value three and the value seven, and may store the carry value one for a subsequent operation.

Referring now to the second operation 210 in FIG. 2, in obtaining the sum of the values 103 and 27, the values in the second column 212 (e.g., the carry value one, the value zero, and the value two) may be added. Since this addition operation yields the value three, the second partial result 214 may be determined to be the value three as shown in the second operation 210.

In one aspect of the disclosure, to perform the previously discussed second operation 210, the receiver device 104 may perform the following procedure. The receiver device 104 may stream the value 103 from the sender device 102, compute the hash of the value 103, and store the value zero. The receiver device 104 may verify that the computed hash of the value 103 matches H1 described above. The receiver device 104 may then stream the value 27 from the sender device 102, compute the hash of the value 27, and store the value two. The receiver device 104 may verify that the computed hash of the value 27 matches H2 described above. The receiver device 104 may then obtain the sum of the carry value one, the value zero, and the value two. Since this addition operation yields the value three (e.g., the second partial result 214), the receiver device 104 may update the hash context state "hash_sum" accordingly. For example, the receiver device 104 may implement the function "hash_sum.update(3)."

Referring now to the third operation 220 in FIG. 2, in obtaining the sum of the values 103 and 27, the value one may be added to the value zero (not shown) as indicated in the column 222. Since this addition operation yields the value one, the third partial result 224 may be determined to be one as shown in the third operation 220.

In one aspect of the disclosure, to perform the previously discussed third operation 220, the receiver device 104 may perform the following procedure. The receiver device 104 may stream the value 103 from the sender device 102, compute the hash of the value 103, and store the value one. The receiver device 104 may verify that the computed hash of the value 103 matches H1 described above. The receiver device 104 may then stream the value 27 from the sender device 102, compute the hash of the value 27, and store the value zero. The receiver device 104 may verify that the computed hash of the value 27 matches H2 described above. The receiver device 104 may then obtain the sum of the value one and the value zero. Since this addition operation yields the value one (e.g., the third partial result 224), the receiver device 104 may update the hash context state "hash_sum" accordingly. For example, the receiver device 104 may implement the function "hash_sum.update(1)." It should be understood that if a carry value (e.g., a carry value one) were to result from the third operation 220, the receiver device 104 would update the hash context state "hash_sum" accordingly.

After the receiver device 104 obtains the third partial result 224 and completes updating the hash context state "hash_sum," the "hash_sum" enables the receiver device 104 to obtain the hash of the result of the addition operation for the values 103 and 27 (e.g., denoted as SHA256(103+27)) without the receiver device 104 ever having to store either or both of the values 103 and 27, or the sum (e.g., 130) of the values 103 and 27, in a memory of the receiver device 104. In some aspects, a partial result obtained after an operation (e.g., operations 200, 210, and 220) may be discarded after the hash context has been updated using the partial result from the operation. Therefore, in some aspects, it can be appreciated that the receiver device 104 may store one of the partial results at a given time, which may reduce the storage capacity requirements of the receiver device 104 for performing the arithmetic operation.

Moreover, in some aspects of the disclosure, the receiver device 104 is able to detect if the sender device 102 supplied an incorrect value for one of the input values. In an aspect, if the receiver device 104 uses the sum as an input for a subsequent arithmetic operation, the receiver device 104 may be able to use the previously obtained hash of the sum to verify that the sender device 102 sends the correct result.

Although the example in FIG. 2 is described using base-10 arithmetic to reduce complexity and facilitate understanding of the offloaded addition operation disclosed herein, it should be understood that the offloaded addition operation may be implemented using portions of large input values of a different number system, such as the binary number system. For example, the receiver device 104 may apply the above described procedures to obtain the sum of two large input values (e.g., 2048 bit values) by summing two 32-bit words of the two large input values at a time. Accordingly, each of the partial results (e.g., first partial result 204, second partial result 214, etc.) may be a 32-bit word. Therefore, for example, it can be appreciated that the receiver device 104 may apply the above described procedures to obtain the sum (e.g., a hash of the sum) of large input values (e.g., 2048 bit values) without ever storing the large input values in a memory of the receiver device 104. In one aspect of the disclosure, the receiver device 104 may obtain the sum of the large input values as part of a signature verification operation under circumstances where the storage capacity of the receiver device 104 is limited or constrained. In the aspect described with respect to FIG. 2, it should be noted that for each of the operations 200, 210, and 220, the sender device 102 may resend the input values (e.g., 103 and 27) to the receiver device 104. As such, there may be a tradeoff between the available storage capacity at the receiver device 104 and the loss of bandwidth and various delays resulting from the retransmissions of the input values.

Offloaded Multiplication

Figure 3A:
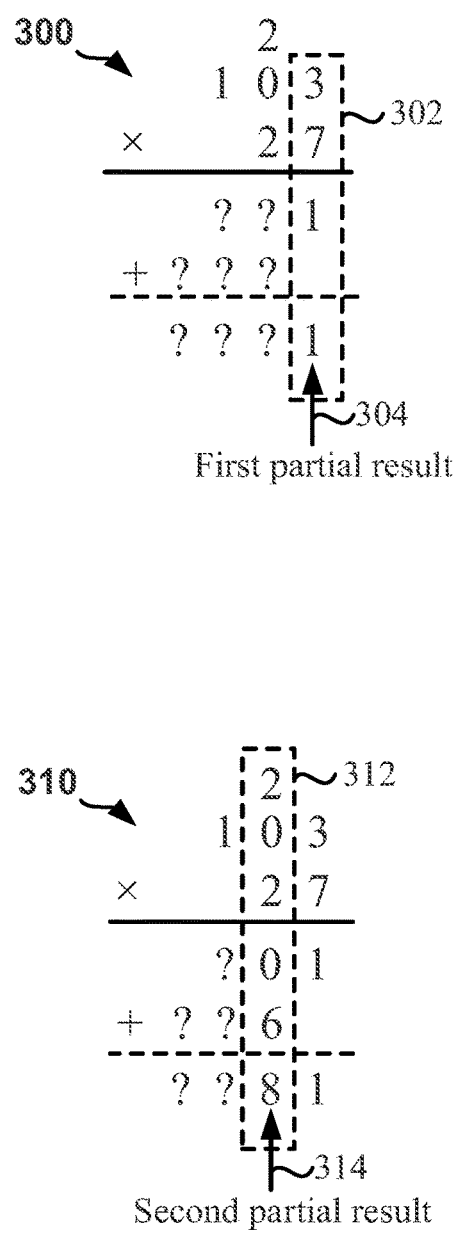

FIG. 3 (including FIGS. 3A and 3B) shows an example offloaded multiplication operation in accordance with the various aspects disclosed herein. In an aspect, the offloaded multiplication operation may be performed by the receiver device 104. In one example, the receiver device 104 may try to obtain the value C, where C=A×B. In such example, and as shown in FIG. 3, the value A may be 103 and the value B may be 27. In an aspect of the disclosure, the receiver device 104 may not have adequate storage capacity to store the values 103 and 27. In an aspect of the disclosure, the receiver device 104 may obtain the hash of the value 103 and the hash of the value 27. In an aspect, the hash of the value 103 may be referred to as "H1" and may be obtained by implementing the hash function SHA256(103), and the hash of the value 27 may be referred to as "H2" and may be obtained by implementing the hash function SHA256(27). Therefore, as shown in the first operation 300 in FIG. 3A, in obtaining the product of the values 103 and 27, the value three may be multiplied with the value seven as indicated in the first column 302. Since this multiplication operation yields the value 21, the first partial result 304 is determined to be one and a carry value two is applied to the next column of numbers as shown in operation 300 of FIG. 3A.

In one aspect of the disclosure, to perform the previously discussed first operation 300, the receiver device 104 may perform the following procedure. The receiver device 104 may initialize a new hash context. For example, the receiver device 104 may implement the function "hash_product=new SHA_256( )." The receiver device 104 may stream the value 103 from the sender device 102, compute the hash of the value 103, and store the value three. The receiver device 104 may verify that the computed hash of the value 103 matches H1 described above. The receiver device 104 may then stream the value 27 from the sender device 102, compute the hash of the value 27, and store the value seven. The receiver device 104 may verify that the computed hash of the value 27 matches H2 described above. The receiver device 104 may then obtain the product of the value three and the value seven. The receiver may identify the value one as being the partial result (e.g., the first partial result 304) of the product of the value three and the value seven, and may update the hash context state "hash_product" accordingly. For example, the receiver device 104 may implement the function "hash_product.update(<next partial result>)." Therefore, in this example, the receiver device 104 may implement the function "hash_product.update(1)." The receiver may identify the value two as being the carry value resulting from the product of the value three and the value seven, and may store the carry value two for a subsequent operation.

Referring now to the second operation 310 in FIG. 3A, in obtaining the product of the values 103 and 27, the value seven may be multiplied with the value zero, and the value two may be multiplied with the value three as indicated in the second column 312. As shown in the second column 312, the receiver device 104 may add the carry value two, the value zero, and the value six to obtain the value eight (e.g., the second partial result 314) as shown in the second operation 310.

In one aspect of the disclosure, to perform the previously discussed second operation 310, the receiver device 104 may perform the following procedure. The receiver device 104 may stream the value 103 from the sender device 102, compute the hash of the value 103, and store the value zero. The receiver device 104 may verify that the computed hash of the value 103 matches H1 described above. The receiver device 104 may then stream the value 27 from the sender device 102, compute the hash of the value 27, and store the value seven. The receiver device 104 may verify that the computed hash of the value 27 matches H2 described above. The receiver device 104 may then obtain the product of the value zero and the value seven, and may store the product (e.g., the value zero). The receiver device 104 may then stream the value 103 from the sender device 102, compute the hash of the value 103, and store the value three. The receiver device 104 may verify that the computed hash of the value 103 matches H1 described above. The receiver device 104 may then stream the value 27 from the sender device 102, compute the hash of the value 27, and store the value two. The receiver device 104 may verify that the computed hash of the value 27 matches H2 described above. The receiver device 104 may then obtain the product of the value three and the value two and may store the product (e.g., the value six). The receiver device 104 may then obtain the sum of the carry value two, the stored value zero, and the stored value six. Since this addition operation yields the value eight (e.g., the second partial result 314), the receiver device 104 may update the hash context state "hash_product" accordingly. For example, the receiver device 104 may implement the function "hash_product.update(8)."

Referring now to the third operation 320 in FIG. 3B, in obtaining the product of the values 103 and 27, the value seven may be multiplied with the value one, and the value two may be multiplied with the value zero as indicated in the third column 322. As shown in the third column 322, the receiver device 104 may add the value seven and the value zero to obtain the value seven (e.g., the third partial result 324) as shown in the third operation 320.

In one aspect of the disclosure, to perform the previously discussed third operation 320, the receiver device 104 may perform the following procedure. The receiver device 104 may stream the value 103 from the sender device 102, compute the hash of the value 103, and store the value one. The receiver device 104 may verify that the computed hash of the value 103 matches H1 described above. The receiver device 104 may then stream the value 27 from the sender device 102, compute the hash of the value 27, and store the value seven. The receiver device 104 may verify that the computed hash of the value 27 matches H2 described above. The receiver device 104 may then obtain the product of the value one and the value seven and may store the product (e.g., the value seven). The receiver device 104 may then stream the value 103 from the sender device 102, compute the hash of the value 103, and store the value zero. The receiver device 104 may verify that the computed hash of the value 103 matches H1 described above. The receiver device 104 may then stream the value 27 from the sender device 102, compute the hash of the value 27, and store the value two. The receiver device 104 may verify that the computed hash of the value 27 matches H2 described above. The receiver device 104 may then obtain the product of the value zero and the value two and may store the product (e.g., the value zero). The receiver device 104 may then obtain the sum of the stored value seven and the stored value zero. Since this operation yields the value seven (e.g., the third partial result 324), the receiver device 104 may update the hash context state "hash_product" accordingly. For example, the receiver device 104 may implement the function "hash_product.update(7)."

Referring now to the fourth operation 330 in FIG. 3B, in obtaining the product of the values 103 and 27, the value one may be multiplied with the value two as indicated in the fourth column 332. As shown in the fourth column 332, the receiver device 104 may determine that the value two is the fourth partial result 334 as shown in the fourth operation 330.

In one aspect of the disclosure, to perform the previously discussed fourth operation 330, the receiver device 104 may perform the following procedure. The receiver device 104 may stream the value 103 from the sender device 102, compute the hash of the value 103, and store the value one. The receiver device 104 may verify that the computed hash of the value 103 matches H1 described above. The receiver device 104 may then stream the value 27 from the sender device 102, compute the hash of the value 27, and store the value two. The receiver device 104 may verify that the computed hash of the value 27 matches H2 described above. The receiver device 104 may then obtain the product of the value one and the value two, and may store the product (e.g., the value two). As shown in the fourth column 332, the receiver device 104 may determine that the value two is the fourth partial result 334 as shown in the fourth operation 330. The receiver device 104 may update the hash context state "hash_product" accordingly. For example, the receiver device 104 may implement the function "hash_product.update(2)."

With reference to FIG. 3B, it should be noted that the example offloaded multiplication operation may produce intermediate values, such as "701" and "206" (e.g., where "206" is shifted by one decimal place to effectively be "2060"). In this example, the sum of these intermediate values (and any carry values, such as the carry value two shown in FIGS. 3A and 3B) represents the final result (e.g., the value 2781 in FIG. 3B) of the multiplication operation. Therefore, as previously described, the receiver device 104 may perform an addition operation with respect to portions of these intermediate values (and any carry values) to determine the partial results (e.g., partial results 304, 314, 324, and 334) without storing the entirety of the intermediate values.

Although the example in FIG. 3 is described using base-10 arithmetic to reduce complexity and facilitate understanding of the offloaded multiplication operation disclosed herein, it should be understood that the offloaded multiplication operation may be implemented using portions of large input values of a different number system, such as the binary number system. For example, the receiver device 104 may apply the above described procedures to obtain the product of two large input values (e.g., 2048 bit values) by multiplying two 32-bit words of the two large input values at a time. Accordingly, each of the partial results (e.g., first partial result 204, second partial result 214, etc.) may be a 64-bit word. Therefore, for example, it can be appreciated that the receiver device 104 may apply the above described procedures to obtain the product of large input values (e.g., 2048 bit values) without ever storing the large input values in a memory of the receiver device 104. In an aspect of the disclosure, the receiver device 104 may obtain the product (e.g., a hash of the product) of the large input values as part of a signature verification operation under circumstances where the storage capacity of the receiver device 104 is limited or constrained.

In the aspect described with respect to FIG. 3, it should be noted that for each of the operations 300, 310, 320, and 330, the sender device 102 may resend the input values (e.g., 103 and 27) to the receiver device 104. As such, there may be a tradeoff between the available storage capacity at the receiver device 104 and the loss of bandwidth and various delays resulting from the retransmissions of the input values. Although the operations 300, 310, 320, and 330 for determining the product of the values 103 and 27 are performed in a column-by-column manner, it should be understood that a row-by-row approach may be implemented in other aspects. In such aspects, the amount of storage (e.g., RAM) required by the receiver device 104 may increase (e.g., to enable storage of an additional hash context). However, the previously described loss of bandwidth and various delays resulting from the retransmissions of the input values may be reduced, since the input values may need to be streamed in only once for the arithmetic operation.

It should be noted that whenever a portion of an input value is needed, the entire input value may be streamed in from the sender device 102, and only the required portion may be stored at the receiver device 104. As previously discussed, the input value from the sender device 102 may be checked (e.g., verified as being correct) by the receiver device 104 by computing its hash and matching to a previously obtained hash. In some aspects, the entire input value may not need to be streamed in from the sender device 102 whenever a portion of an input value is needed by the receiver device 104. In some aspects, a partial result obtained from an operation (e.g., operations 300, 310, 320, and 330), portions of intermediate values associated with the operation, and/or any carry values associated with the operation may be discarded by the receiver device 104 after the receiver device 104 has updated the hash context using the partial result of the operation. Therefore, in some aspects, it can be appreciated that the receiver device 104 may store one of the partial results at a given time, which may reduce the storage capacity requirements of the receiver device 104 for performing the arithmetic operation. In an aspect, the size of the portions of the input values described herein may be selected based on an available storage capacity of the receiver device 104. In such aspects, when the size of each portion is increased, a processing bandwidth of the receiver device 104 may be increased and a processing delay of the receiver device 104 may be reduced.

Offloaded Modular Arithmetic

Figure 4A:
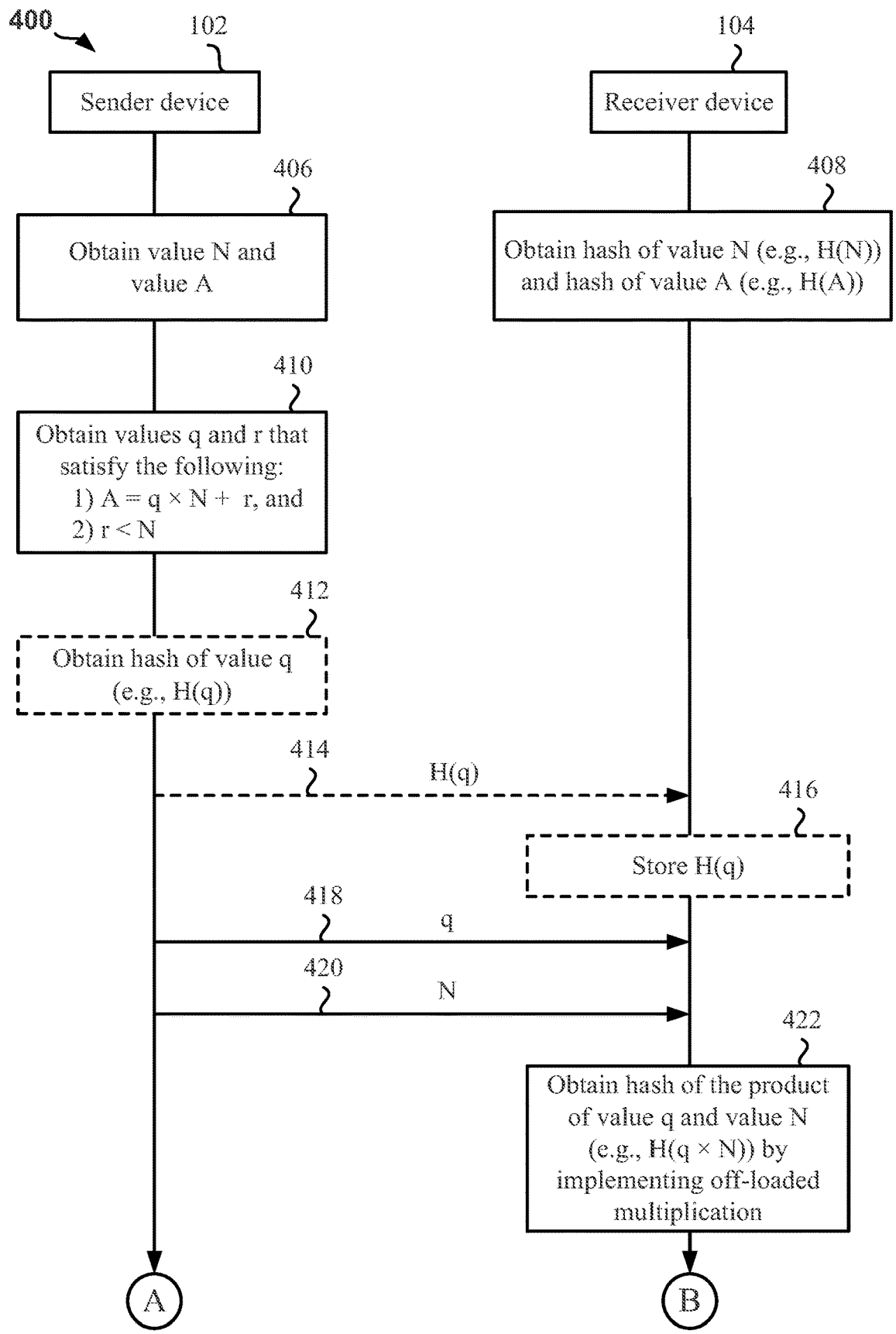
FIG. 4 (including FIGS. 4A and 4B) shows an example offloaded modular reduction operation in accordance with the various aspects of the disclosure.
Figure 4B:
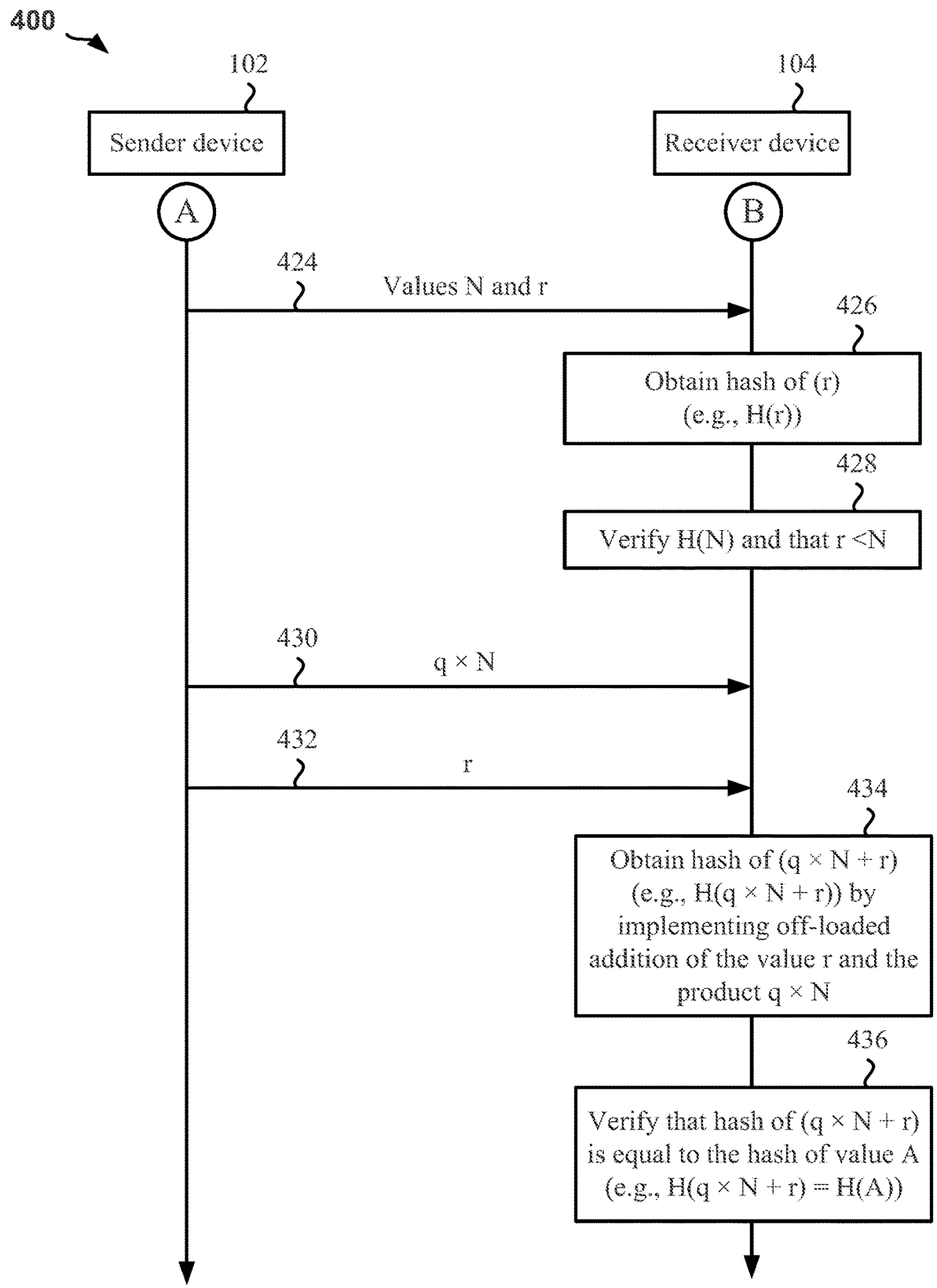

FIG. 4 (including FIGS. 4A and 4B) shows an example offloaded modular reduction operation in accordance with the various aspects disclosed herein. In an aspect of the disclosure, the result of the offloaded modular reduction may be obtained by the receiver device 104. The example offloaded modular reduction operation shown in FIG. 4 illustrates a procedure that enables the receiver device 104 to obtain the hash of the result of the expression "A mod N," where the value A (e.g., the dividend) and the value N (e.g., the divisor) represent integer values. It should be understood that the result of the expression A mod N is the remainder r (also referred to as the value r) after the value A is divided by the value N. Accordingly, the value A in the expression A mod N may be obtained by implementing the division theorem shown in equation 2:

$$A = q \times N + r \qquad \text{(equation 2)}$$

where the value q (e.g., the quotient) represents an integer, and r<N.

It can be appreciated that the approach implemented in FIG. 4 offloads mathematical operations required for determining the result of A mod N to the sender device 102, which may be better suited to perform the mathematical operations (e.g., multiplication and/or division operations involving large input values). For example, the sender device 102 may have adequate storage capacity and/or bandwidth to perform the mathematical operations, thereby reducing the burden on the receiver device 104 to perform the mathematical operations under circumstances where the receiver device 104 may be memory and/or bandwidth constrained. It can be further appreciated that the receiver device 104 may verify one or more of the values provided by the sender device 102 to ensure that the sender is not behaving maliciously (e.g., providing altered or corrupted values).

As shown in FIG. 4A, at operation 406, the sender device 102 may obtain the value N and the value A. At operation 408, the receiver device 104 may obtain a hash of the value N (denoted as H(N)) and a hash of the value A (denoted as H(A)). At operation 410, the sender device 102 may obtain the value q and the value r, such that the values q, r, A, and N satisfy equation 2 above.

At optional operation 412, the sender device 102 may obtain a hash of the value q (denoted as H(q)) and may transmit 414 the hash of the value q to the receiver device 104. At optional operation 416, the receiver device 104 may store the hash of the value q in a storage (e.g., a memory, such as RAM).

At operation 418, the sender device 102 may transmit 418 the value q and may transmit 420 the value N to the receiver device 104. At operation 422, the receiver device 104 may obtain a hash of the product between the values q and N (denoted as H(q×N)). In an aspect, the receiver device 104 may obtain the hash of the product between the values q and N by implementing the off-loaded multiplication approach previously discussed with respect to FIGS. 3A and 3B. For example, the receiver device 104 may stream in the values q and N from the sender device 102, determine the product between a portion of the value q and a portion of the value N, and update a hash context state (e.g., "hash_product") based on the product. In this example, the receiver device 104 may again stream in the values q and N from the sender device 102, determine another product between another portion of the value q and another portion of the value N, and update the hash context state (e.g., "hash_product") based on the another product. This procedure may be repeated until the receiver device 104 obtains the final hash context state (e.g., H(q×N)).

Referring now to FIG. 4B, the sender device 102 may transmit 424 the value N and the value r to the receiver device 104. At operation 426, the receiver device 104 may obtain the hash of the value r (also denoted as H(r)). In an aspect, the receiver device 104 may store H(r). At operation 428, the receiver device 104 may verify the hash of the value N (e.g., H(N)) and may verify that the value r is less than the value N.

As shown in FIG. 4B, the sender device 102 may transmit 430 the product of the value q and the value N (e.g., q×N), and may transmit 432 the value r, to the receiver device 104. In an aspect, the receiver device 104 may verify the product (e.g., q×N) by applying a hash function to the product (e.g., q×N) and matching the resulting hash to the final hash context state (e.g., H(q×N)).

At operation 434, the receiver device 104 may obtain the hash of the sum of the value r and the product of the value q and the value N (also denoted as H(q×N+r))). In an aspect, the receiver device 104 may obtain the hash of the sum of the value r and the product of the value q and the value N (also denoted as H(q×N+r) by implementing the offloaded addition approach previously discussed with respect to FIG. 2. For example, the receiver device 104 may stream in the product q×N and the value r from the sender device 102, determine the sum between a portion of the product q×N and a portion of the value r, and update a hash context state (e.g., "hash_sum") based on the sum. In this example, the receiver device 104 may again stream in the product q×N and the value r from the sender device 102, determine another sum between another portion of the product q×N and another portion of the value r, and update the hash context state (e.g., "hash_sum") based on the another sum. This procedure may be repeated until the receiver device 104 obtains the final hash context state (e.g., H(q×N+r)). Finally, at operation 436, the receiver device 104 may verify that H(q×N+r) is equal to H(A).

Therefore, in one aspect of the disclosure, the receiver device 104 may implement the previously described offloaded modular arithmetic operation to verify the signature S 110 attached to the message M 108. For example, to facilitate verification of the signature S 110, equation 1 discussed above may be expressed as equation 3:

$$S^e \bmod N = \text{PAD}(H(M)) \quad \text{(equation 3)}$$

where S represents the signature S 110 (e.g., a 2048 bit value), e (e.g., a value that is less than or equal to 256 bits) and N (e.g., a 2048 bit value) represent the public key of the sender device 102, H(M) represents the result of a hash function applied to the message M 108, and PAD represents a padding function. In some aspects, $S^e$ may correspond to the previously described value A (e.g., the dividend in the expression A mod N). In this example, the receiver device 104 may perform an offloaded modular reduction operation (e.g., in cooperation with the sender device 102) as described herein with reference to the example in FIG. 4 to determine $S^e$ mod N. In doing so, the receiver device 104 may obtain the values q, N, and r (e.g., where r represents the result of $S^e$ mod N in this example), and the hash of the expression q×N+r (also expressed as H(q×N+r)). In an aspect, the receiver device 104 may obtain H($S^e$) by implementing the offloaded multiplication operation described herein with reference to the example in FIG. 3.

In one aspect of the disclosure, the receiver device 104 may compare H($S^e$) to H(q×N+r). If H($S^e$) is equal to H(q×N+r), the receiver device 104 may determine that the value r is a valid result (e.g., the remainder) of the modulo operation $S^e$ mod N. The receiver device may then compare the value r to PAD(H(M)). If the value r is equal to PAD(H(M)), the receiver device 104 may determine that the verification of the signature S 110 is successful. The receiver device 104 may proceed to process the message M 108 when the verification of the signature S 110 is successful.

Therefore, in the aspects described herein, as the sizes of the portions of the previously described input values used in the offloaded arithmetic operations (e.g., offloaded addition, offloaded multiplication, offloaded modular arithmetic) are increased, the previously described loss of bandwidth and various delays resulting from the retransmissions of the input values may be reduced. However, since the sizes of the portions will be larger in such aspects, this reduction may be achieved at the expense of the storage (e.g., RAM) of the receiver device 104. In some aspects, the number of hash values stored at the receiver device 104 may be reduced by implementing hash trees (also referred to as Merkle trees). For example, a hash tree is a generalization of a hash list, which may be a list of hashes of the data blocks in a file or a set of files. However, such implementation of hash tress may increase the previously described loss of bandwidth and the various delays resulting from the retransmissions of the input values.

The term "hash function" as used herein may refer to a non-keyed hash function or a keyed hash function. For example, a keyed hash function may be a universal hash function, a pseudorandom function (PRF), or a keyed-hash message authentication code (HMAC). In some aspects of the disclosure, the keyed hash function may produce a hash based on an input value and a key. In some aspects of the disclosure, the key may be a secret key unknown to the sender device 102. In some aspects of the disclosure, the key may be randomly generated.

Exemplary Device and Method

Figure 5:
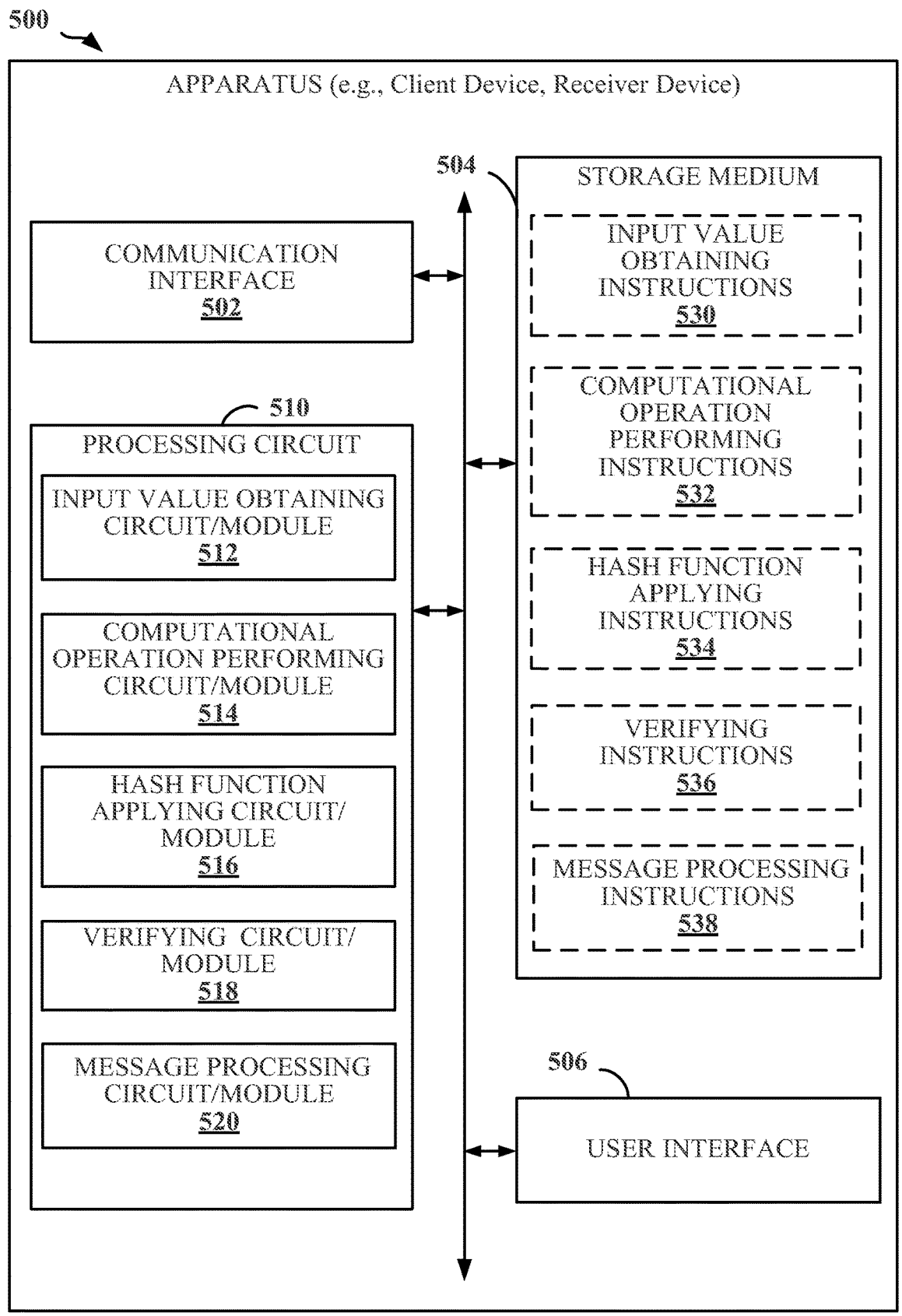
FIG. 5 is block diagram illustrating select components of an apparatus according to at least one example of the disclosure.

FIG. 5 is block diagram illustrating select components of an apparatus 500 in accordance with various aspects of the disclosure. The apparatus 500 includes a communication interface 502, a storage medium 504, a user interface 506, and a processing circuit 510. The processing circuit 510 is coupled to or placed in electrical communication with each of the communication interface 502, the storage medium 504, the user interface 506, and the shared hardware resources 508.

The communication interface 502 may include, for example, one or more of: signal driver circuits, signal receiver circuits, amplifiers, signal filters, signal buffers, or other circuitry used to interface with a signaling bus or other types of signaling media. In some aspects, the communication interface 502 may be configured to transmit and/or receive wireless communications.

The processing circuit 510 is arranged to obtain, process and/or send data, control data access and storage, issue commands, and control other desired operations. The processing circuit 510 may include circuitry adapted to implement desired programming provided by appropriate media in at least one example. In some instances, the processing circuit 510 may include circuitry adapted to perform a desired function, with or without implementing programming. By way of example, the processing circuit 510 may be implemented as one or more processors, one or more controllers, and/or other structure configured to execute executable programming and/or perform a desired function.

Examples of the processing circuit 510 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 510 are for illustration and other suitable configurations within the scope of the disclosure are also contemplated.

The processing circuit 510 is adapted for processing, including the execution of programming, which may be stored on the storage medium 504. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 510 may include one or more of: an input value obtaining circuit/module 512, a computational operation performing circuit/module 514, a hash function applying circuit/module 516, a verifying circuit/module 518, and a message processing circuit/module 520.

The input value obtaining circuit/module 512 may include circuitry and/or instructions (e.g., input value obtaining instructions 530 stored on the storage medium 504) adapted to obtain at least a first input value and a second input value from a sender device, obtain the final result of the computational operation from the sender device, and/or obtain a fourth input value (e.g., r) from the sender device.

The computational operation performing circuit/module 514 may include circuitry and/or instructions (e.g., computational operation performing instructions 532 stored on the storage medium 504) adapted to perform steps of a computational operation between portions of the first input value and portions of the second input value to obtain a plurality of partial results of the computational operation, and/or to perform steps of a second computational operation between portions of the third input value and portions of the fourth input value to obtain a plurality of partial results of the second computational operation.

The hash function applying circuit/module 516 may include circuitry and/or instructions (e.g., hash function applying instructions 534 stored on the storage medium 504) adapted to apply a hash function to each of the plurality of partial results of the computational operation to obtain a hash of a final result of the computational operation between the first input value and the second input value, to apply the hash function to the final result obtained from the sender device to obtain a second hash of the final result, and/or to apply the hash function to each of the plurality of partial results of the second computational operation to obtain a hash of a final result of the second computational operation between the third input value and the fourth input value.

The verifying circuit/module 518 may include circuitry and/or instructions (e.g., verifying instructions 536 stored on the storage medium 504) adapted to verify that the final result of the computational operation from the sender device is correct based on the hash of the final result of the computational operation, verify an integrity of at least the first input value or the second input value each time that the first input value or the second input value is obtained, verify that the dividend value is equal to the sum of the remainder value and the product of the divisor value and the quotient value by matching a hash of the dividend value to the hash of the final result of the second computational operation between the third input value and the fourth input value, and/or to verify a signature of a message obtained from the sender device based at least on the fourth input value and a hash of the message.

The message processing circuit/module 520 may include circuitry and/or instructions (e.g., message processing instructions 538 stored on the storage medium 504) adapted to process the message when the verification of the signature is successful.

The storage medium 504 may represent one or more processor-readable devices for storing programming, electronic data, databases, or other digital information. The storage medium 504 may also be used for storing data that is manipulated by the processing circuit 510 when executing programming. The storage medium 504 may be any available media that can be accessed by the processing circuit 510, including portable or fixed storage devices, optical storage devices, and various other mediums capable of storing, containing and/or carrying programming. By way of example and not limitation, the storage medium 504 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 504 may be coupled to the processing circuit 510 such that the processing circuit 510 can read information from, and write information to, the storage medium 504. That is, the storage medium 504 can be coupled to the processing circuit 510 so that the storage medium 504 is at least accessible by the processing circuit 510, including examples where the storage medium 504 is integral to the processing circuit 510 and/or examples where the storage medium 504 is separate from the processing circuit 510.

Programming/instructions stored by the storage medium 504, when executed by the processing circuit 510, causes the processing circuit 510 to perform one or more of the various functions and/or process steps described herein. For example, the storage medium 504 may include one or more of: input value obtaining instructions 530, computational operation performing instructions 532, hash function applying instructions 534, verifying instructions 536, and message processing instructions 538. Thus, according to one or more aspects of the disclosure, the processing circuit 510 is adapted to perform (in conjunction with the storage medium 504) any or all of the processes, functions, steps and/or routines for any or all of the apparatuses described herein.

As used herein, the term "adapted" in relation to the processing circuit 510 may refer to the processing circuit 510 being one or more of configured, employed, implemented, and/or programmed (in conjunction with the storage medium 504) to perform a particular process, function, step and/or routine according to various features described herein.

With the above in mind, examples of operations according to the disclosed aspects will be described in more detail in conjunction with the flowchart of FIG. 6 (including FIGS. 6A and 6B). For convenience, the operations of FIGS. 6A and 6B (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation. It should be understood that operations indicated with dashed lines in FIGS. 6A and 6B represent optional operations.

Figure 6A:
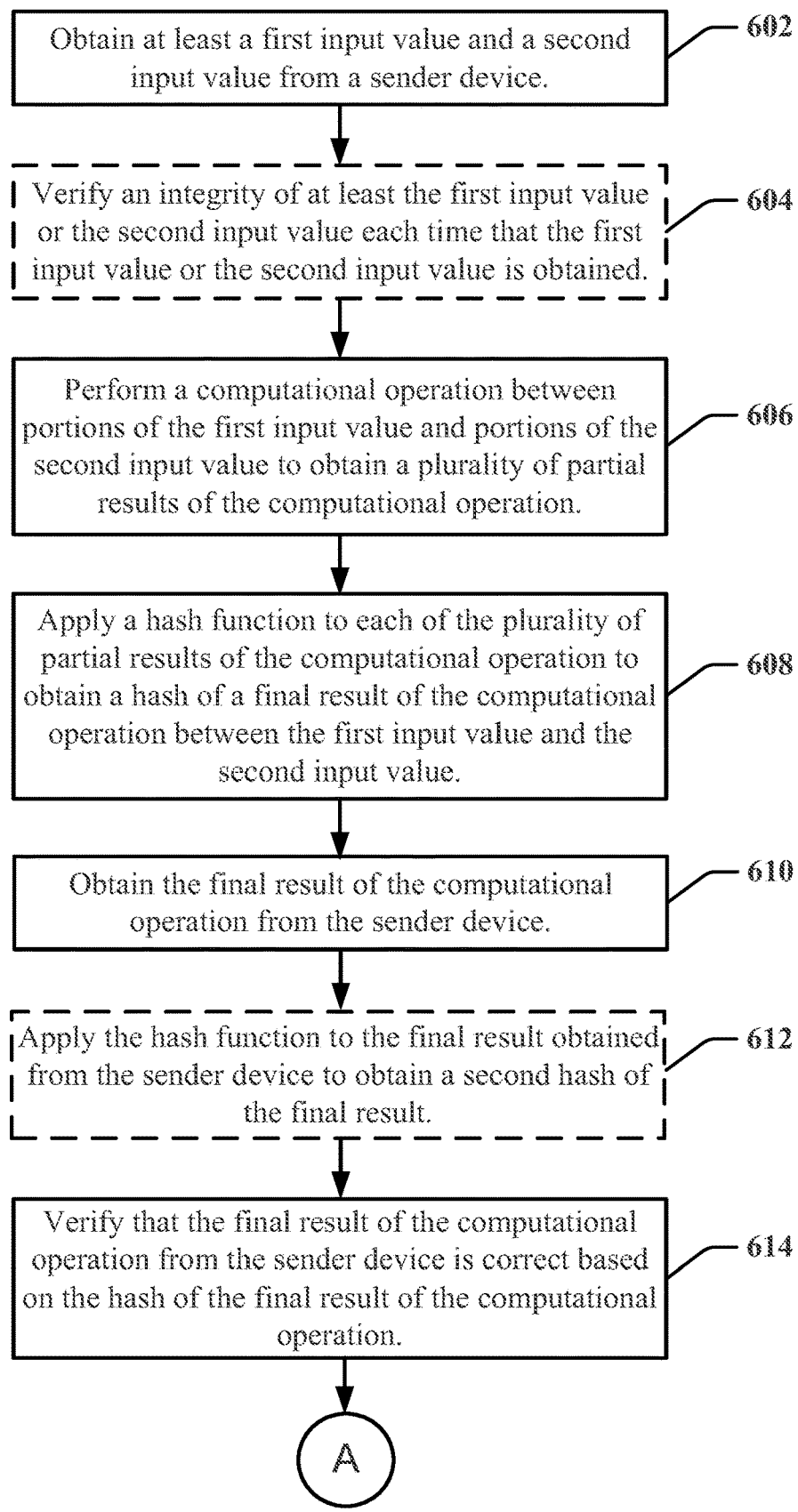
FIG. 6 (including FIGS. 6A and 6B) is a flowchart illustrating a method in accordance with various aspects of the present disclosure.
Figure 6B:
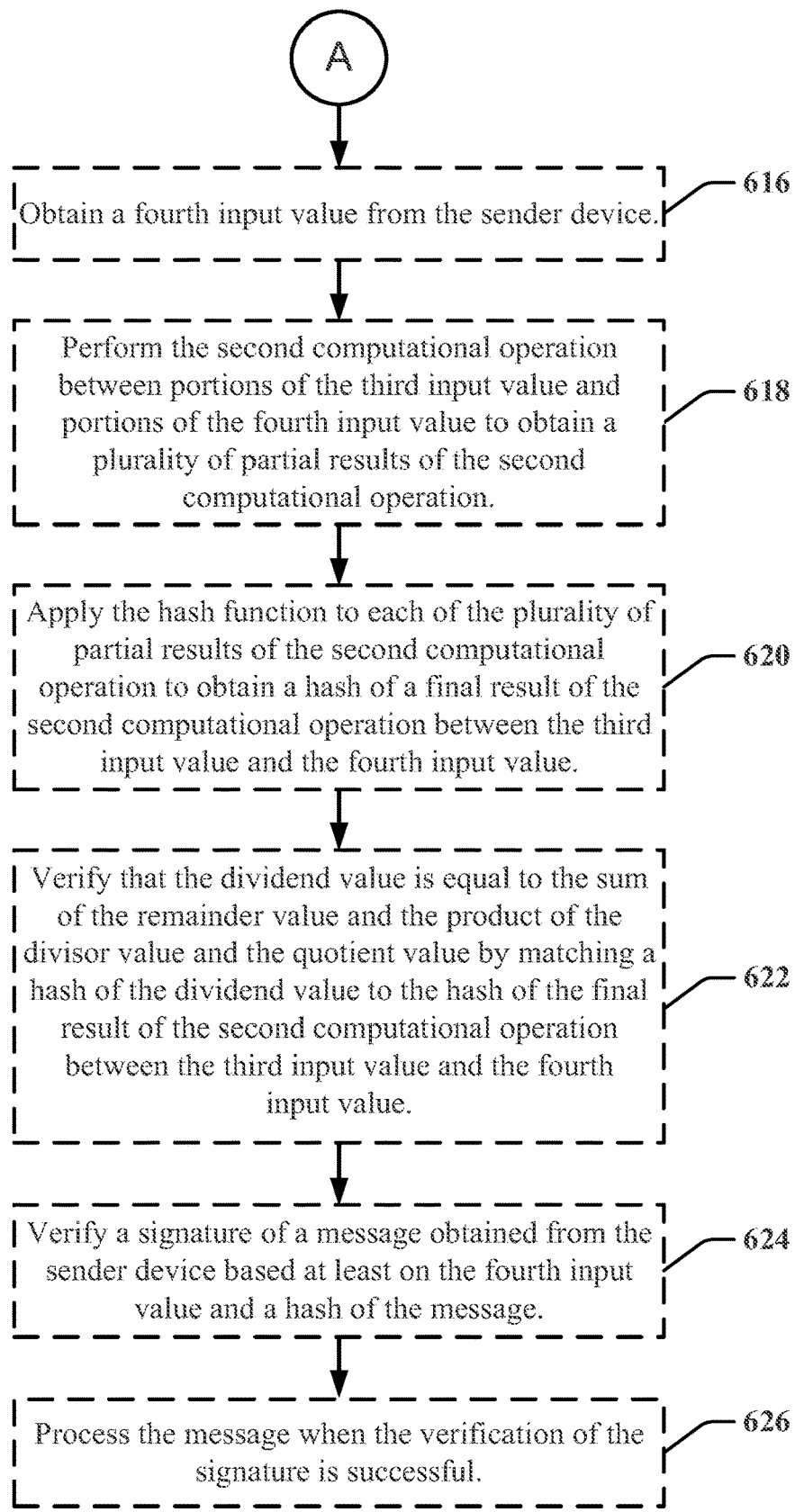

With reference to FIG. 6A, the apparatus (e.g., the receiver device 104) obtains at least a first input value and a second input value from a sender device 602. In one aspect of the disclosure, a size of at least one of the first input value or the second input value exceeds an available storage capacity of an apparatus. In one aspect of the disclosure, a size of required intermediate results of the computational operation between the first input value and the second input value exceeds an available storage capacity of an apparatus. In one aspect of the disclosure, a size of the final result of the computational operation between the first input value and the second input value exceeds an available storage capacity of an apparatus. In one aspect of the disclosure, a total size of one of the portions of the first input value, one of the portions of the second input value, and one of the partial results of the computational operation is less than or equal to the available storage capacity of an apparatus.

The apparatus verifies an integrity of at least the first input value or the second input value each time that the first input value or the second input value is obtained 604. In one aspect of the disclosure, the apparatus verifies the integrity of at least the first input value or the second input value by obtaining a hash of the first input value or a hash of the second input value, and matching the obtained hash of the first or second input value to a previously obtained hash. In one aspect of the disclosure, the previously obtained hash is included in a hash tree. In one aspect of the disclosure, the sender device (e.g., the sender device 102) is an untrusted sender device.

The apparatus performs a computational operation between portions of the first input value and portions of the second input value to obtain a plurality of partial results of the computational operation 606. In one aspect of the disclosure, a size of each of the portions of the first input value and each of the portions of the second input value are selected based on an available storage capacity of an apparatus, such that when the size is increased, a processing bandwidth of the apparatus is increased and a processing delay of the apparatus is reduced. In one aspect, at least the first input value or the second input value is obtained from the sender device prior to performing each step of the computational operation.

In one aspect of the disclosure, the computational operation may be a multiplication operation. In such aspect, the final result of the computational operation may be a product between the first input value and the second input value. In one aspect, the first input value is a divisor value (e.g., the value N in FIG. 4) in a modulo operation (e.g., the modulo operation A mod N previously described with reference to FIG. 4), and the second input value is a quotient value (e.g., the value q in FIG. 4) associated with the modulo operation.

In one aspect of the disclosure, the computational operation is an addition operation. In such aspect, the final result of the operation may be a sum between the first input value and the second input value The apparatus applies a hash function to each of the plurality of partial results of the computational operation to obtain a hash of a final result of the computational operation between the first input value and the second input value 608. In one aspect of the disclosure, the apparatus applies the hash function to each of the plurality of partial results by initializing a hash context, updating the hash context as each one of the plurality of partial results is obtained, and discarding each of the plurality of partial results after the hash context is updated. In one aspect of the disclosure, the hash function is a non-keyed hash function. In another aspect of the disclosure, the hash function is a keyed hash function.

The apparatus obtains the final result of the computational operation from the sender device 610. The apparatus may apply the hash function to the final result obtained from the sender device to obtain a second hash of the final result 612. The apparatus verifies that the final result of the computational operation from the sender device is correct based on the hash of the final result of the computational operation 614. In an aspect, the apparatus verifies that the final result of the computational operation from the sender device is correct by matching the hash of the final result to the second hash of the final result.

In an aspect of the disclosure, the final result of the computational operation may be a third input value for a second computational operation. In such aspect, with reference to FIG. 6B, the apparatus obtains a fourth input value from the sender device 616. The apparatus performs the second computational operation between portions of the third input value and portions of the fourth input value to obtain a plurality of partial results of the second computational operation 618. The apparatus applies the hash function to each of the plurality of partial results of the second computational operation to obtain a hash of a final result of the second computational operation between the third input value and the fourth input value 620.

In an aspect, the second computational operation may be an addition operation, the third input value may be a product of a divisor value and a quotient value, and the fourth input value may be a remainder value of a modulo operation with respect to a dividend value and the divisor value. In such aspect, the apparatus verifies that the dividend value is equal to the sum of the remainder value and the product of the divisor value and the quotient value by matching a hash of the dividend value to the hash of the final result of the second computational operation between the third input value and the fourth input value 622.

The apparatus verifies a signature of a message obtained from the sender device based at least on the fourth input value and a hash of the message 624. The apparatus processes the message when the verification of the signature is successful 626.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like. As used herein, the term "obtaining" may include one or more actions including, but not limited to, receiving, generating, determining, computing, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method, comprising:
   obtaining, at a receiver device, at least a first input value and a second input value from a sender device;
   performing, at the receiver device, a computational operation between the first input value and the second input value by sequentially performing a series of individual computational operations between portions of the first input value and portions of the second input value to obtain a series of partial results of the computational operation;
   applying, at the receiver device, a hash function to each of the series of partial results to sequentially obtain a series of partial hashes, where the series of partial hashes form a full hash that matches a hash of a final result of the computational operation between the first input value and the second input value;
   obtaining, at the receiver device, the final result of the computational operation between the first input value and the second input value from the sender device; and
   verifying, at the receiver device, that the final result of the computational operation from the sender device is correct based on the full hash.

2. The method of claim 1, wherein a size of at least one of the first input value or the second input value exceeds an available storage capacity of the receiver device.

3. The method of claim 1, wherein a size of required intermediate results of the computational operation between the first input value and the second input value exceeds an available storage capacity of the receiver device.

4. The method of claim 1, wherein a size of the final result of the computational operation between the first input value and the second input value exceeds an available storage capacity of the receiver device.

5. The method of claim 1, wherein a total size of one of the portions of the first input value, one of the portions of the second input value, and one of the partial results of the computational operation is less than or equal to an available storage capacity of the receiver device.

6. The method of claim 1, wherein obtaining, at the receiver device, at least the first input value or the second input value comprises:
   repeatedly obtaining at least the first input value in its entirety or the second input value in its entirety from the sender device to obtain the portions of the first and second input values.

7. The method of claim 6, wherein the sender device is an untrusted sender device, the method further comprising:
   verifying an integrity of at least the first input value or the second input value each time the first input value or the second input value is obtained in its entirety.

8. The method of claim 7, wherein verifying the integrity of at least the first input value or the second input value comprises:
   obtaining a hash of the first input value or a hash of the second input value; and
   matching the obtained hash of the first input value or second input value to a previously obtained hash.

9. The method of claim 8, wherein the previously obtained hash is included in a hash tree.

10. The method of claim 1, wherein a size of each of the portions of the first input value and each of the portions of the second input value are selected based on an available storage capacity of the receiver device, and wherein when the size is increased, a processing bandwidth of the receiver device is increased and a processing delay of the receiver device is reduced.

11. The method of claim 1, wherein applying the hash function to each of the series of partial results comprises:
    initializing a hash context;
    updating the hash context as each one of the series of partial results is obtained; and
    discarding each of the series of partial results after the hash context is updated.

12. The method of claim 1, wherein the final result of the computational operation is a third input value for a second computational operation, the method further comprising:
    obtaining, at a receiver device, a fourth input value from the sender device;
    performing, at the receiver device, the second computational operation between the third input value and the fourth input value by sequentially performing a series of individual computational operations between portions of the third input value and portions of the fourth input value to obtain a series of partial results of the second computational operation; and
    applying, at the receiver device, the hash function to each of the series of partial results to sequentially obtain a second series of partial hashes, where the second series of partial hashes form a second full hash that matches a hash of a final result of the second computational operation between the third input value and the fourth input value.

13. The method of claim 12, wherein the second computational operation is an addition operation, wherein the third input value is a product of a divisor value and a quotient value, wherein the fourth input value is a remainder value of a modulo operation with respect to a dividend value and the divisor value, the method further comprising:
    verifying that the dividend value is equal to a sum of the remainder value and the product of the divisor value and the quotient value by matching a hash of the dividend value to the hash of the final result of the second computational operation between the third input value and the fourth input value.

14. The method of claim 13, further comprising:
    verifying, at the receiver device, a signature of a message obtained from the sender device based at least on the fourth input value and a hash of the message; and
    processing, at the receiver device, the message when the verification of the signature is successful.

15. The method of claim 1, further comprising:
    applying, at the receiver device, the hash function to the final result obtained from the sender device to obtain a second full hash of the final result, and
    wherein the verifying that the final result of the computational operation from the sender device is correct comprises matching the full hash of the final result to the second full hash of the final result.

16. An apparatus comprising:
    a storage device; and
    a processing circuit coupled to the storage device, the processing circuit configured to:
        obtain at least a first input value and a second input value from a sender device;
        perform a computational operation between the first input value and the second input value by sequentially performing a series of individual computational operations between portions of the first input value and portions of the second input value to obtain a series of partial results of the computational operation;

apply a hash function to each of the series of partial results to sequentially obtain a series of partial hashes, where the series of partial hashes form a full hash that matches a hash of a final result of the computational operation between the first input value and the second input value;

obtain the final result of the computational operation between the first input value and the second input value from the sender device; and verify that the final result of the computational operation from the sender device is correct based on the full hash.

17. The apparatus of claim 16, wherein the sender device is an untrusted sender device, and wherein the processing circuit is further configured to:

obtain the portions of the first and second input values by repeatedly obtaining at least the first input value in its entirety or the second input value in its entirety from the sender device; and verify an integrity of at least the first input value or the second input value each time that the first input value or the second input value is obtained in its entirety.

18. The apparatus of claim 16, wherein the final result of the computational operation is a third input value for a second computational operation, and wherein the processing circuit is further configured to:

obtain a fourth input value from the sender device;

perform the second computational operation between the third input value and the fourth input value by sequentially performing a series of individual computational operations between portions of the third input value and portions of the fourth input value to obtain a series of partial results of the second computational operation;

apply the hash function to each of the series of partial results of the second computational operation to obtain a second series of partial hashes, where the second series of partial hashes form a second full hash that matches a hash of a final result of the second computational operation between the third input value and the fourth input value.

19. The apparatus of claim 18, wherein the second computational operation is an addition operation, wherein the third input value is a product of a divisor value and a quotient value, wherein the fourth input value is a remainder value of a modulo operation with respect to a dividend value and the divisor value, and wherein the processing circuit is further configured to:

verify that the dividend value is equal to a sum of the remainder value and the product of the divisor value and the quotient value by matching a hash of the dividend value to the hash of the final result of the second computational operation between the third input value and the fourth input value.

20. The apparatus of claim 19, wherein the processing circuit is further configured to:

verify a signature of a message obtained from the sender device based at least on the fourth input value and a hash of the message; and process the message when the verification of the signature is successful.

21. The apparatus of claim 16, wherein the processing circuit is further configured to:

apply the hash function to the final result obtained from the sender device to obtain a second full hash of the final result, and wherein the verifying that the final result of the computational operation from the sender device is correct comprises matching the full hash of the final result to the second full hash of the final result.

22. An apparatus comprising:

means for obtaining at least a first input value and a second input value from a sender device;

means for performing a computational operation between the first input value and the second input value by sequentially performing a series of individual computational operations between portions of the first input value and portions of the second input value to obtain a series of partial results of the computational operation;

means for applying a hash function to each of the series of partial results to sequentially obtain a series of partial hashes, where the series of partial hashes form a full hash that matches a hash of a final result of the computational operation between the first input value and the second input value;

means for obtaining the final result of the computational operation between the first input value and the second input value from the sender device; and means for verifying that the final result of the computational operation from the sender device is correct based on the full hash.

23. The apparatus of claim 22, wherein the sender device is an untrusted sender device, the apparatus further comprising:

means for verifying an integrity of at least the first input value or the second input value each time that the first input value or the second input value is obtained in its entirety.

24. The apparatus of claim 22, wherein the final result of the computational operation is a third input value for a second computational operation, the apparatus further comprising:

means for obtaining a fourth input value from the sender device;

means for performing the second computational operation between the third input value and the fourth input value by sequentially performing a series of individual computational operations between portions of the third input value and portions of the fourth input value to obtain a series of partial results of the second computational operation; and means for applying the hash function to each of the series of partial results of the second computational operation to obtain a second series of partial hashes, where the second series of partial hashes form a second full hash that matches a hash of a final result of the second computational operation between the third input value and the fourth input value.

25. The apparatus of claim 22, further comprising:

means for applying the hash function to the final result obtained from the sender device to obtain a second full hash of the final result, and wherein the means for verifying that the final result of the computational operation from the sender device is correct comprises means for matching the full hash of the final result to the second full hash of the final result.

26. A non-transitory machine-readable storage medium, the machine-readable storage medium having one or more instructions which when executed by a processing circuit causes the processing circuit to:
- obtain, at a receiver device, at least a first input value and a second input value from a sender device;
- perform, at the receiver device, a computational operation between the first input value and the second input value by sequentially performing a series of individual computational operations between portions of the first input value and portions of the second input value to obtain a series of partial results of the computational operation;
- apply, at the receiver device, a hash function to each of the series of partial results to sequentially obtain a series of partial hashes, where the series of partial hashes form a full hash that matches a hash of a final result of the computational operation between the first input value and the second input value;
- obtain, at the receiver device, the final result of the computational operation between the first input value and the second input value from the sender device; and
- verify, at the receiver device, that the final result of the computational operation from the sender device is correct based on the full hash.

27. The method of claim 6, wherein repeatedly obtaining at least the first input value in its entirety or the second input value in its entirety from the sender device comprises repeatedly streaming in the first and second input values in their entirety from the sender device.

28. The method of claim 1, wherein the receiver obtains the portions of the first and second input values, performs the series of individual computational operations, and applies the hash function to the series of partial results without storing the first and second input values in their entirety.

29. The apparatus of claim 17, wherein the processing circuit is further configured to repeatedly obtain at least the first input value in its entirety or the second input value in its entirety from the sender device by repeatedly streaming in the first and second input values in their entirety from the sender device.

30. The apparatus of claim 16, wherein the processing circuit is further configured to obtain the portions of the first and second input values, perform the series of individual computational operations, and apply the hash function to the series of partial results without storing the first and second input values in their entirety in the storage device.

* * * * *